United States Patent [19]

Elkins et al.

[11] 3,937,847

[45] Feb. 10, 1976

[54] METHOD OF AND MEANS FOR PRESERVING PERISHABLE FOODSTUFFS

[76] Inventors: William Elkins, 7081 Galli Drive, San Jose, Calif. 95127; Harold H. Kuehn, 1760 Los Altos Drive, San Mateo, Calif. 94402; Richard H. Chamberlin, 273 Cypress Ave., San Bruno, Calif. 94066

[22] Filed: Aug. 2, 1974

[21] Appl. No.: 494,194

[52] U.S. Cl. .................... 426/231; 21/121; 62/78; 62/125; 99/467; 423/219; 426/541; 426/416; 426/418

[51] Int. Cl.² .......................................... A23L 3/00

[58] Field of Search ........... 426/418, 474, 319, 320, 426/324, 419, 393, 416, 231, 541; 99/467, 646; 21/58, 91, 121; 165/27, 30; 423/219, 580; 82/125, 78, 186

[56] References Cited
UNITED STATES PATENTS

| | | | |
|---|---|---|---|
| 2,784,059 | 4/1957 | Lindewald | 426/418 |
| 3,437,428 | 4/1969 | Quesada et al. | 426/324 X |
| 3,598,518 | 8/1971 | Gobo | 423/219 |

FOREIGN PATENTS OR APPLICATIONS 6,812,922   9/1968   Netherlands .................... 426/419

*Primary Examiner*—S. Leon Bashore
*Assistant Examiner*—Kenneth M. Schor
*Attorney, Agent, or Firm*—Phillips, Moore, Weissenberger Lempio & Strabala

[57] ABSTRACT

A method of preserving foodstuffs by placing them in a container of given volume in which air at atmospheric pressure is present and selectively removing the oxygen from the air in the container while maintaining substantially atmospheric pressure therein is disclosed. According to the invention, a flow of air is established through the container by means of an external conduit in which the oxygen in the air is catalytically reacted with hydrogen gas concurrently generated and added to the air flow for at least a predetermined length of time after which the generation and addition of hydrogen gas is terminated when the hydrogen/oxygen reaction falls below a given level. Various embodiments of the apparatus for practicing the method according to this invention are described.

15 Claims, 11 Drawing Figures

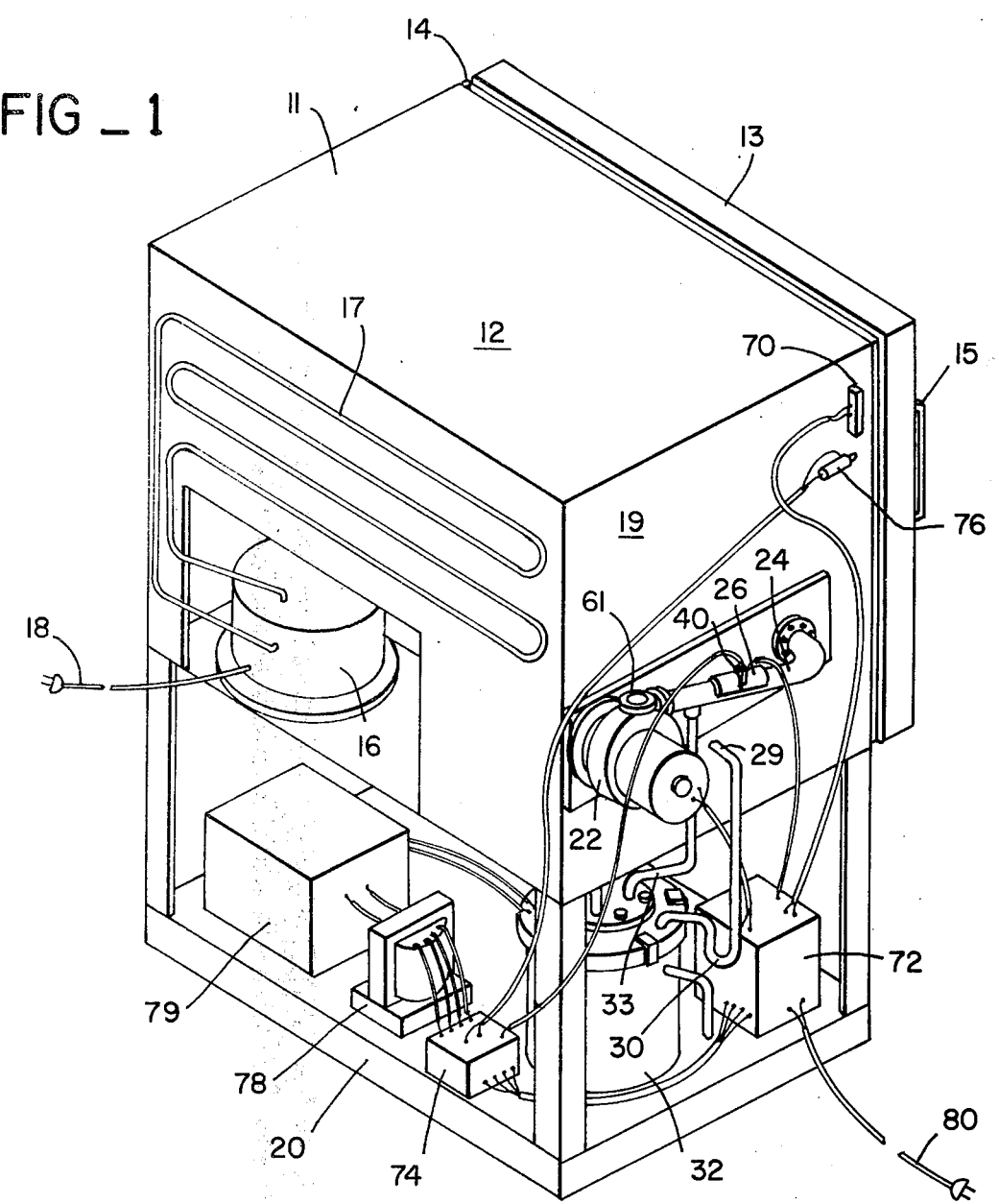
FIG_1
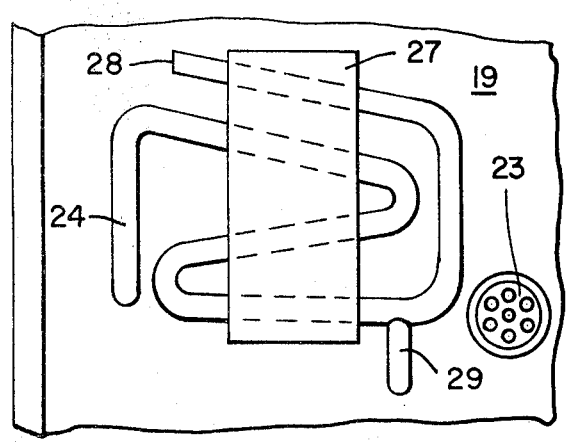
FIG_2

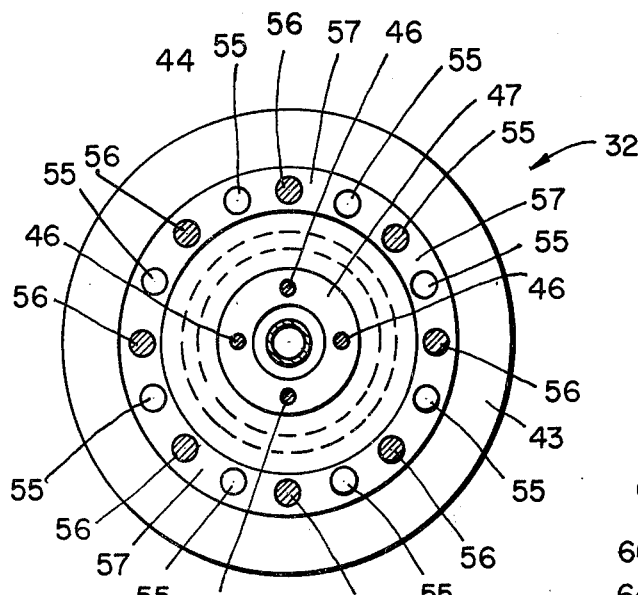
FIG_5
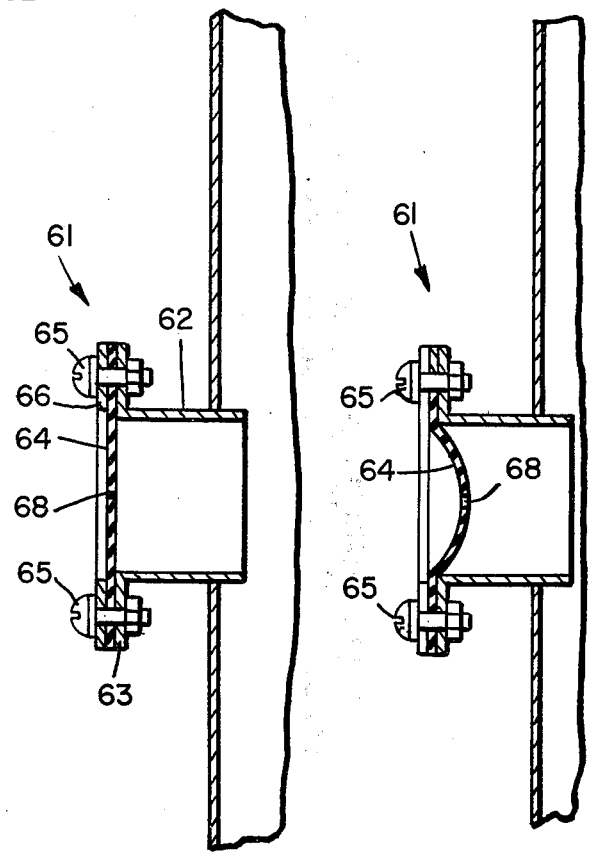
FIG_6   FIG_7
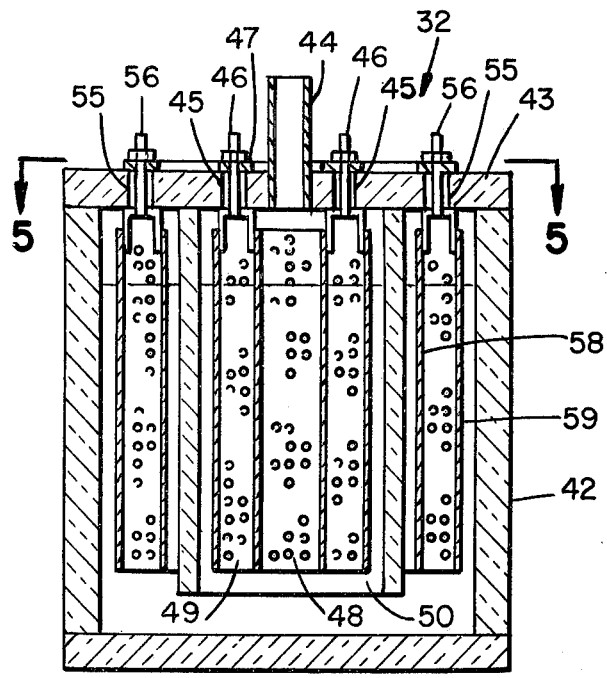
FIG_4
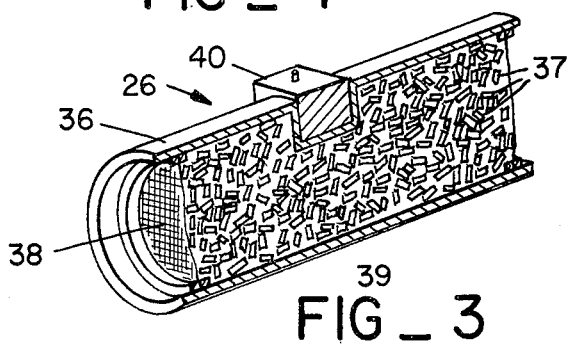
FIG_3
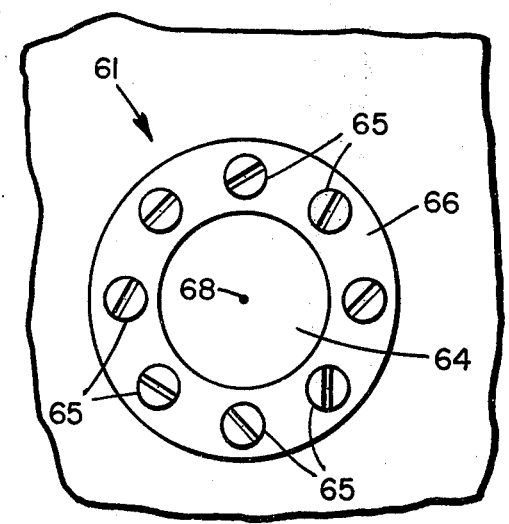
FIG_8

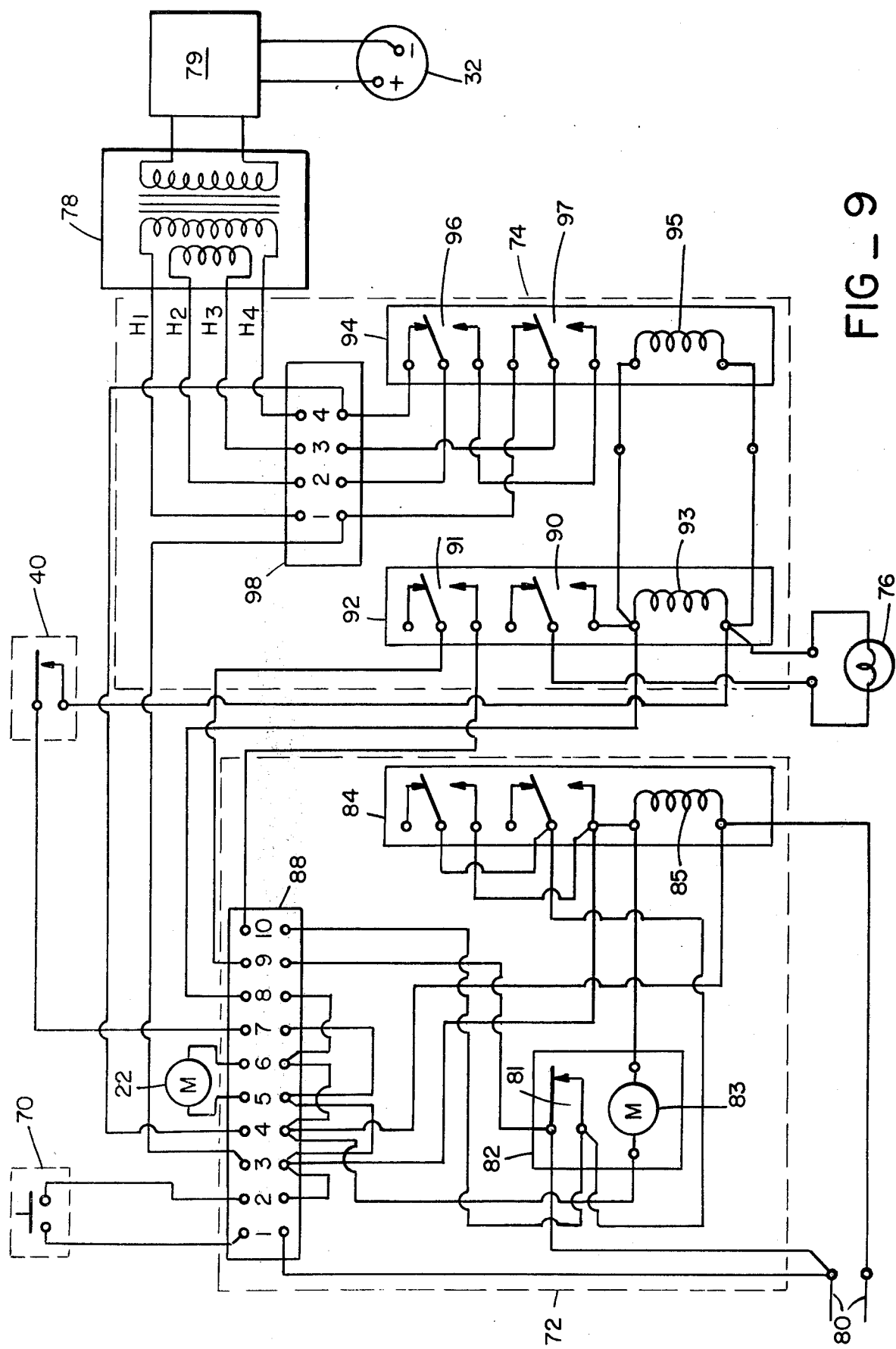
FIG_9

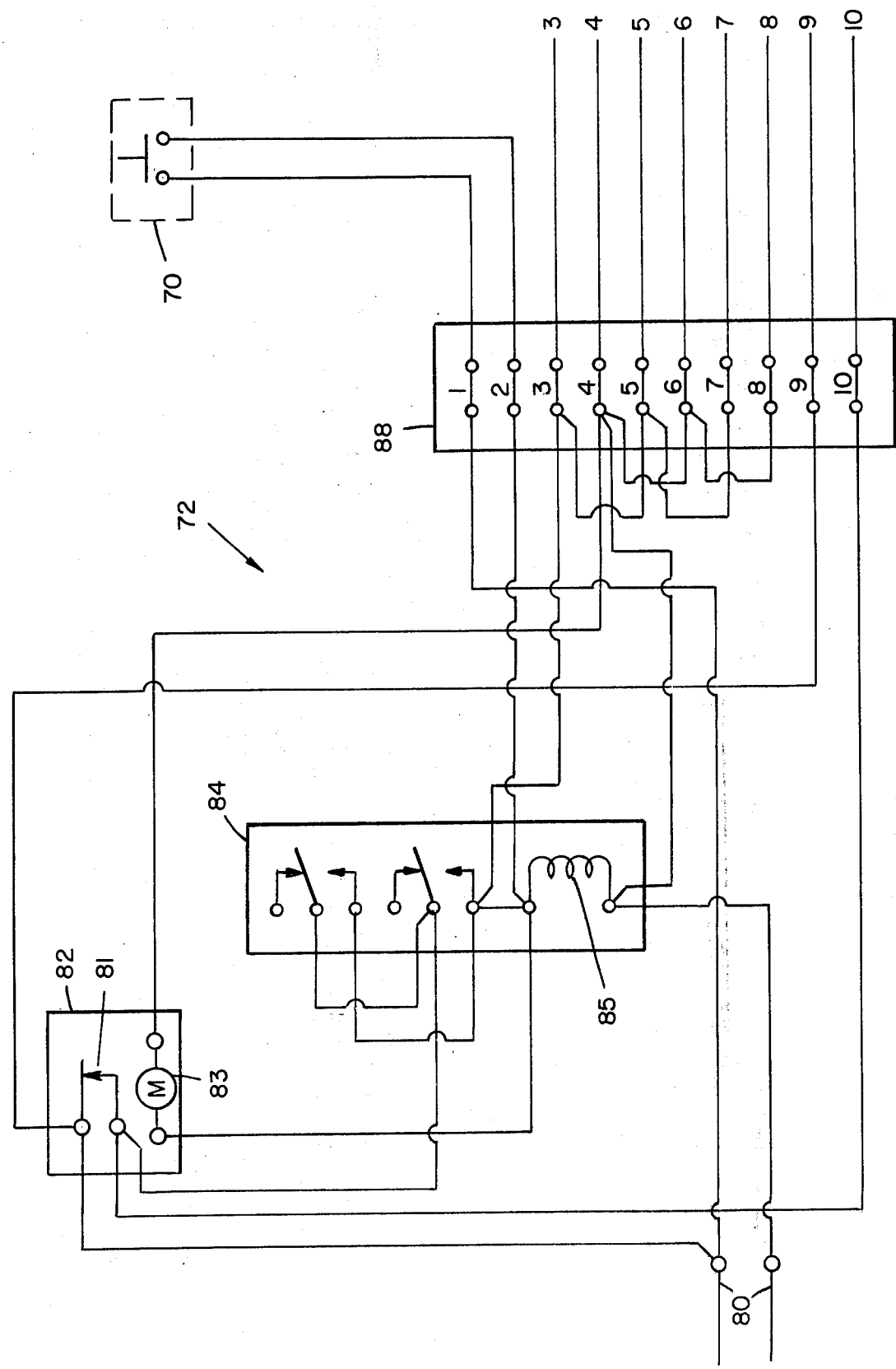
FIG_10A

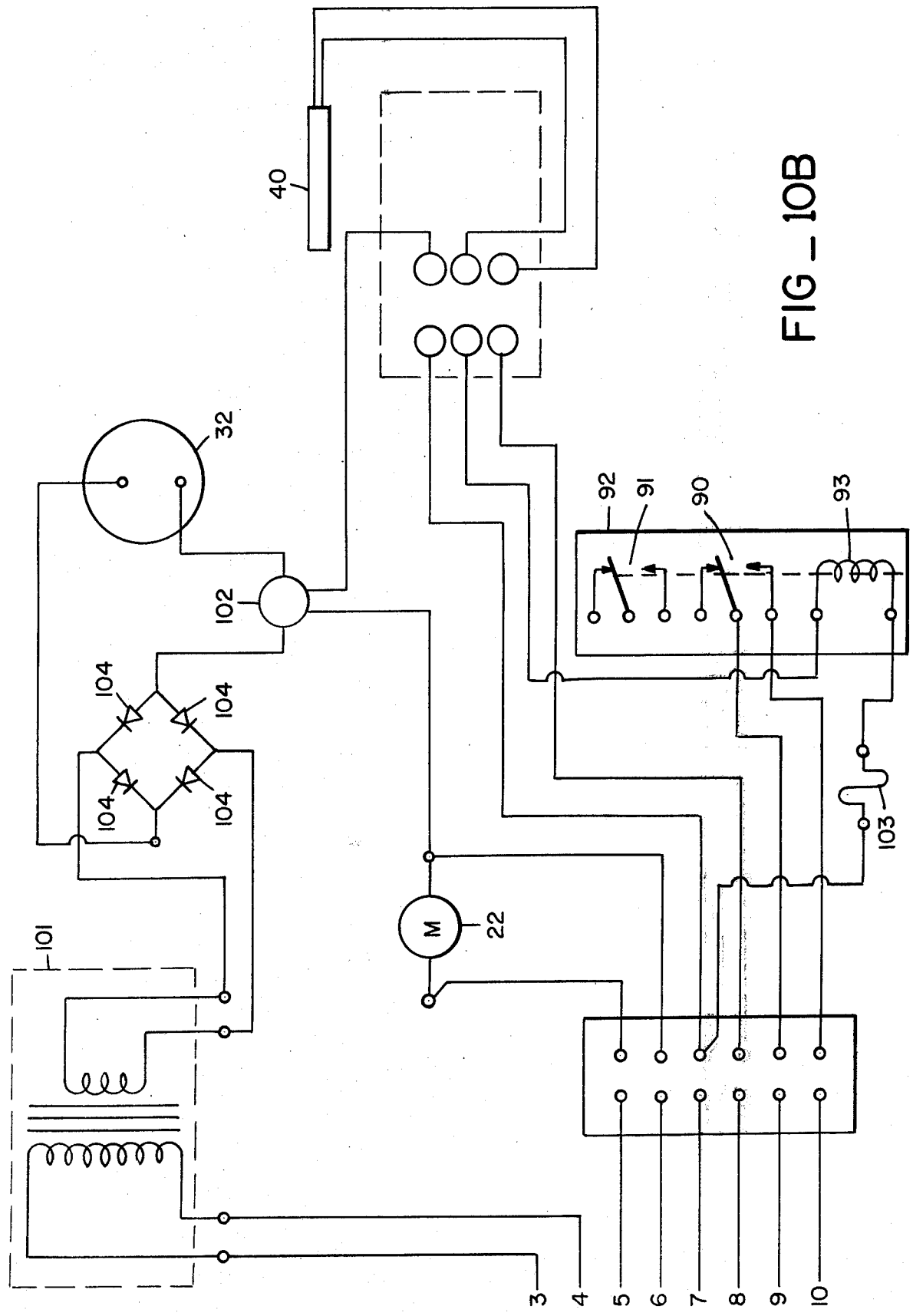

METHOD OF AND MEANS FOR PRESERVING PERISHABLE FOODSTUFFS

BACKGROUND OF THE INVENTION

This invention relates to the preservation of foodstuffs which are perishable through oxidation or organic decomposition by maintaining the foodstuffs in an inert gas atmosphere and more particularly to a method of and means for preserving foodstuffs by maintaining them in a container of air at substantially atmospheric pressure from which oxygen has been removed by generating hydrogen and reacting it with such oxygen without substantial increase in the hydrogen content of the air in the container or substantial decrease in the pressure of the air in the container.

The major constituent of air is nitrogen gas ($N_2$) which comprises over 75% of dry air at sea level, on the average, both by weight and by volume, whereas oxygen gas ($O_2$) normally comprises over 20% of dry air, both by weight and by volume, with the balance of about 2% of dry air being composed of trace amounts of other gases. It has long been known that if the oxygen is removed from the air in a container of foodstuffs, the remaining nitrogen rich atmosphere will contribute markedly to the preservation of such foodstuffs. Thus, U.S. Pat. No. 77,768 granted to Schoonmaker in 1868 proposed to preserve grain by placing it in a substantially sealed container and providing means for circulating the air in the container through a closed system over a heated bed of oxidizable solids to remove the oxygen from the air. Similarly, U.S. Pat. No. 709,431 granted to Baker in 1902 teaches the inclusion of oxidizable solids within a substantially sealed volume containing perishable foodstuffs for the purpose of removing the oxygen from the air in such volume. According to the teaching of both patents, means are provided for maintaining atmospheric pressure within the volume or container.

However, the oxidizable solids must be periodically replaced and the effectiveness of each charge of oxidizable solids in removing the oxygen from the air in the container or volume will steadily decrease over the life thereof.

It is an object of this invention to provide a method and means for preserving perishable foodstuffs by removing the oxygen from a container of air surrounding such foodstuffs which do not involve the use of oxidizable solids and in which the rate of removal of the oxygen is solely dependent on amount of oxygen present in the air.

According to the teaching of U.S. Pat. No. 677,837 granted to Wrightnour in 1901, it was proposed to preserve perishable foodstuffs by introducing liquid air into a closed volume containing such foodstuffs and rely on the fact that nitrogen gas is given off first in the evaporation of liquid air to force out the air present in the volume and provide a nitrogen rich atmosphere in such volume. However, the charge of liquid air must be replaced before any appreciable evaporation of oxygen gas therefrom thus requiring more or less constant attendance and frequent maintenance. Similarly, U.S. Pat. Nos. 3,239,360 and 3,415,310 teach the replacement of the air in a substantially closed volume containing perishable foodstuffs with an inert gas such as nitrogen gas from a prepared source thereof.

It is another object of this invention to provide a method of and means for utilizing the nitrogen gas present in the air in a container for perishable foodstuffs as the inert gas required to preserve such foodstuffs by removing the oxygen therefrom and without adding inert gas from a prepared source other than the air.

It has been proposed in a series of patents to use various methods and means for preserving perishable foodstuffs by controlling the relative amount of oxygen and carbon dioxide present in the air in a volume containing such foodstuffs (see, for example, U.S. Pat. Nos. 2,780,923 and 3,102,777–3,102,780). However, such methods and means have required some degradation in the foodstuffs to provide the carbon dioxide involved therein.

It is a further object of this invention to reduce toward a minimum the production of carbon dioxide by the degradation of perishable foodstuffs due to oxidation thereof and to reduce toward minimum the amount of carbon dioxide present in the air contained in a container with perishable foodstuffs.

It has heretofore been proposed to use various oxidizable gaseous or vaporous substances to remove oxygen from the air in a substantially closed volume containing perishable foodstuffs by reacting such substances with the oxygen in the air. For example. U.S. Pat. No. 2,789,059 teaches the use of substances such as water gas, methane, benzene, alcohol or other hydrocarbons including butane to react with the oxygen in the air in a volume containing perishable foodstuffs. However, the oxidation of such substances produces byproducts which may contaminate the foodstuffs to give them an undesirable taste and, in fact, the substances themselves will tend to impart an undesirable taste to the foodstuffs. In addition, it is necessary to maintain a continuous supply of such substances for use in removing the oxygen from the air.

It is yet another object of this invention to remove the oxygen from the air in a container for perishable foodstuffs by reacting it with a gaseous substance which is tasteless and which produces tasteless byproducts when oxidized.

Finally, it has been proposed heretofore, to scavenge or purge oxygen from substantially closed containers by introducing hydrogen gas into such containers. For example, in U.S. Pat. No. 3,437,428 it is proposed to add hydrogen gas from a prepared source to the air in a container and react the resultant mixture in a catalytic bed to combine the oxygen and hydrogen into water. According to U.S. Pat. No. 3,598,518, oxygen is removed from closed containers by first flushing the containers with hydrogen gas and then filling the containers with the desired inert gas. However, hydrogen is dangerous to store and use in large quantities since it is inflammable and explosive in the presence of oxygen.

It is yet another object of this invention to remove the oxygen present in the air present in a container with perishable foodstuffs by reacting such oxygen with hydrogen to produce water without increasing the hydrogen content of the air in the container and without requiring the storage or use of much more hydrogen than is required to combine with the oxygen available from the air within container.

SUMMARY OF THE INVENTION

According to this invention, foodstuffs are preserved by placing them within a container of air at atmospheric pressure. An air flow through such container is established by means of a substantially closed conduit system including a gas pump which conduit system has its inlet and outlet coupled to the container at spaced locations. Hydrogen gas is generated and introduced into the substantially closed conduit system at a point intermediate the gas pump and the outlet of the conduit for at least a given predetermined length of time. A catalytic means is interposed in the substantially closed conduit intermediate the point of introduction of the hydrogen and the outlet of the conduit for reacting the hydrogen gas with the oxygen in the air flow. The level of oxygen present in the air flow thus determines the level of the reaction which occurs with the hydrogen in the catalytic means and the generation and introduction of hydrogen is terminated after the end of the above-mentioned predetermined length of time when the level of reaction in the catalytic means decreases to a point corresponding to the desired low level of oxygen in the gas flow. The pressure of the nitrogen rich atmosphere within the defined volume may be maintained near atmospheric by providing for the introduction of small amounts of air during operation. In addition, it is contemplated that the rate at which hydrogen is generated and introduced into the gas flow may be varied in response to the level of oxygen present in such gas flow.

BRIEF DESCRIPTION OF THE DRAWING

The foregoing and other objects and features of this invention will be more fully understood from a reading of the following detailed description of preferred embodiments of the invention in conjunction with the attached drawing wherein:

FIG. 1 is a rear view in perspective of an embodiment of this invention wherein the container is provided by a conventional commercially available apartment size refrigerator with the various elements of this invention operatively coupled to such refrigerator.

FIG. 2 is a side view in elevation of the inside surface of the side wall of the refrigerator of FIG. 1 showing elements of this invention which are mounted internally of such refrigerator.

FIG. 3 is a perspective view partially in cross-section showing a catalytic bed suitable for use according to the teaching of this invention.

FIG. 4 is a cross-sectional view of an electrolytic device suitable for use in the generation of hydrogen gas according to the teaching of this invention.

FIG. 5 is a top view of the electrolytic tank of FIG. 4.

FIG. 6 is a cross-sectional view of a relief valve suitable for use according to the teaching of this invention with the active element thereof shown in one of its operative positions.

FIG. 7 is a cross-sectional view identical to FIG. 6 showing the active element thereof in a second operative position.

FIG. 8 is a top view in elevation of the relief valve of FIGS. 6 and 7.

FIG. 9 is a wiring diagram showing the elements of this invention schematically together with their electrical interconnection.

FIGS. 10a and 10b together constitute a wiring diagram for an alternate embodiment of this invention.

DETAILED DESCRIPTION OF PREFERRED EMBODIMENTS

Referring to FIG. 1, an embodiment of this invention as applied to a conventional commercially available apartment size refrigerator 11 is shown in perspective from the rear. The refrigerator 11 comprises an insulated generally rectangular box-like body 12 open at one side. An insulated door 13 is hinged along one of its vertical edges 14 to the open side of the body 12 and is provided with a handle 15 for selectively closing the open side of the body 12.

The refrigerator 11 includes an appropriate power unit 16 including a compressor which may be driven by an electric motor connected to a power source by means of a power cord 18. The compressor of the power unit 16 is connected to an appropriate cooling coil system 17 filled with an appropriate refrigerant and a portion of which extends within the refrigerator 11 to provide means for maintaining the temperature within the refrigerator 11 below atmospheric in a manner well-known in the prior art.

As shown in FIG. 1, the refrigerator 12 is mounted on a frame 20 together with apparatus according to the teaching of this invention, a portion of such apparatus being mounted on and extending through the insulated side wall 19 of the body 12 of the refrigerator 11 into communication with the interior thereof as best shown in FIG. 2. The purpose of the apparatus according to this invention is to maintain a nitrogen rich atmosphere within the interior of the refrigerator 11 and to this end an air pump 22, which may take the form of an electrically driven centrifugal blower, is mounted on the side wall 19 with its inlet 23 communicating with the interior of the refrigerator 11 through the side wall 19. The outlet of the air pump 22 communicates with a substantially closed conduit 24, a portion of which is formed by a catalytic bed 26 as will be more fully described hereinafter. The conduit 24 extends through the side wall 19 into the interior of the refrigerator 11 where it forms a series of convolutions mounted on the inner surface of the side wall 19 by means of a mounting plate 27 and terminates in an open end or outlet 28 which is spaced from the inlet 23. A drain pipe 29 communicates with the lowest point of the convolutions formed by the conduit 24 within the refrigerator 11, the drain pipe passing out through the side wall 19 of the refrigerator 11 and through an appropriate P-trap 30 into communication with an electrolytic tank 32, as will be more fully described hereinafter.

The electrolytic tank 32 is mounted on the frame 20 below the refrigerator 11 and contains water which is to be dissociated into oxygen and hydrogen through electrical action. To this end, the electrolytic tank 32 is provided with appropriate electrodes and electrical terminals, as will be more fully described hereinafter. The oxygen generated by electrolysis is wasted to the air through appropriate apertures in the top of the electrolytic tank 32 whereas the hydrogen generated by electrolysis is trapped and fed through an appropriate pipe 33 into the conduit 24 intermediate the air pump 22 and the catalytic bed 26. Thus, it will be seen that the hydrogen generated by electrical dissociation of the water in the electrolytic tank 32 will be conducted through the pipe 33 into the air flow established through the conduit 24 by the air pump 22. Such hydrogen gas will become intermixed with the air prior to its passage through the catalytic bed 26 and thus the purpose of the catalytic bed 26 is to cause the hydrogen gas to react with oxygen gas in the air flow to produce water. The reaction between oxygen and hydrogen is sufficiently exothermic to heat the catalytic bed 26 to an elevated temperature thus causing the water formed to vaporize and be carried through the catalytic bed 26 by the air flow.

Upon emergence from the catalytic bed 26 the air flow will consist of a nitrogen rich gas containing water vapor. Such air flow passes through the remainder of the conduit 24 including the convolutions thereof within the refrigerator 11 where the water vapor is condensed and the remaining nitrogen rich gas exits from the outlet 28 of the conduit into the interior of the refrigerator 11. The condensed water vapor flows to the lowest point of the convolutions of the conduit within the refrigerator where it is conducted back through the drain pipe 29 and into the electrolytic tank 32. It will be understood that the low temperature within the refrigerator 11 will aid in condensing the water vapor and that the P-trap 30 will prevent oxygen gas generated in the electrolytic tank from entering the refrigerator 11 through the drain pipe 29.

In operation, a complex air flow pattern will be established within the refrigerator 11 between the outlet 28 of the conduit 24 and the inlet 23 of the air pump 22. Thus, the nitrogen rich gas exiting from the outlet 29 of the conduit 24 will tend to mix with the oxygen bearing air within the refrigerator 11 for recirculation by the air pump 22 through the conduit 24. Such recirculation of the gases within the refrigerator 11 through the conduit 24 including the catalytic bed 26 will result in substantially all of the oxygen therein being combined with hydrogen introduced into the conduit 24 through the pipe 33 to form water leaving a nitrogen rich atmosphere within the refrigerator 11.

It is well known that the deterioration of foodstuffs is largely due to the presence of oxygen in the air surrounding such foodstuffs and that such deterioration can be inhibited, if not completely avoided, by preventing oxygen gas from reaching the foodstuffs. Deterioration of foodstuffs results both from bacterial action and from oxidation of various elements of the foodstuffs. Thus, surrounding the foodstuffs with a nitrogen rich atmosphere from which substantially all of the oxygen has been removed will greatly inhibit such deterioration and can substantially eliminate such deterioration in the chilled interior of a refrigerator which is in the conventional apparatus used to inhibit food deterioration.

Each time the door 13 of the refrigerator 11 is opened warm, oxygen bearing air will, of course, enter the body 12 of the refrigerator 11, mixing with the cold nitrogen rich gas within the refrigerator. Thus, it will be necessary, not only to cool the gases within the refrigerator after the door 13 is closed, but also to remove any oxygen gas which may have entered the refrigerator 11. Thus, according to the teaching of this invention, the apparatus for removing the oxygen from within the refrigerator 11 is adapted to operate each time the refrigerator door 13 is opened for a sufficient length of time to remove any oxygen which may have entered the refrigerator 11 while the door 13 was open.

It will be understood that hydrogen gas is highly flammable and therefore dangerous in large volumes. Thus, according to one important aspect of this invention, hydrogen gas is generated only as needed and any concentration of hydrogen gas within the refrigerator 11 substantially higher than is normally found in the atmosphere is avoided. To this end, and according to the teaching of this invention, the apparatus of this invention is adapted to generate hydrogen gas for a given period of time after each closure of the door 13 of the refrigerator 11. Such given period of time is just sufficient to generate enough hydrogen to combine with enough oxygen in the catalytic bed 26 to heat the catalytic bed 26 to a preselected minimum elevated temperature provided the level of oxygen present in the gas is above a preselected minimum. If the catalytic bed 26 reaches the preselected minimum temperature within the given time period, then the generation of hydrogen gas is continued until the reaction between hydrogen and oxygen in the catalytic bed falls below that necessary to maintain such temperature, due to depletion of oxygen in the air flow through the catalytic bed 26.

Thus, it is impossible for apparatus according to the teaching of this invention to produce an excess of hydrogen gas within the refrigerator 11 under normal operating conditions. Furthermore, it is unnecessary to store large amounts of hydrogen gas for use in producing a nitrogen rich atmosphere within the refrigerator 11 according to the teaching of this invention. As will be more fully explained hereinafter, the apparatus of this invention is easily adapted to include various safety devices to avoid the production of excess hydrogen gas under abnormal operating conditions.

Referring now to FIG. 3, a cross-sectional view of the catalytic bed 26 according to the teaching of this invention is shown. Such catalytic bed 26 comprises a simple section of conduit 36 filled with a plurality of platinum coated ceramic beads or pellets 37. The pellets 37 are shaped in such a way that they do not pack tightly with respect to each other but rather form a myriad of interstices therebetween to provide various passageways for the flow of gases through the bed 26. The pellets 37 are retained within the conduit 36 of the bed 26 by means of perforated walls or screens 38 at each end thereof.

A depression or indentation is formed in the side wall of the conduit 36 of the catalytic bed 26 intermediate the ends thereof to form a socket or cup 39 in which a thermally sensitive switch 40 is mounted in heat conducting relation to the catalytic bed. The switch 40 is designed to close when the catalytic bed reaches a certain predetermined temperature and to remain closed until the temperature of the catalytic bed again drops below such predetermined temperature. As will be more fully described hereinafter, the switch 40 functions to cause the apparatus of this invention to continue to generate hydrogen so long as the reaction between hydrogen and oxygen in the catalytic bed is proceeding at a level sufficient to heat the catalytic bed above such predetermined temperature.

Referring to FIGS. 4 and 5, an electrolytic tank 32 suitable for use in generating hydrogen according to the teaching of this invention is shown. Such tank comprises a cup-shaped body 42 adapted to contain water. The open end of the body 42 is closed by a cap 43 having a centrally located aperture provided with a coupling tube 44 to which the pipe 33 for conducting hydrogen from the tank 32 to the conduit 24 may be connected. The cap 43 is also provided with a first plurality of apertures 45 arranged in circular array about the coupling tube 44 through each of which projects a different one of a plurality of terminal posts 46. The terminal posts 46 are mounted through a cathode terminal ring 47 which rests on the upper surface of the cap 43 with the terminal posts 46 depending therefrom through the apertures 45 into the upper portion of the interior of the body 42.

The cathode of the electrolytic tank is provided by a pair of coaxial perforated metallic cylinders 48 and 49 mounted by one of their ends on the inner end of the terminal posts 46 in electrically conducting relation thereto.

An imperforate cylindrical baffle member 50 coaxially surrounds the cathode cylinders 48 and 49 and has its upper end mounted on the inner surface of the cap 43 in substantially gas-tight relation thereto. A second circular array of a plurality of apertures 55 through the cap member 43 surrounds the array of apertures 45. A second plurality of terminal posts 56, each extending through a different one of the plurality of apertures 55, are mounted on an anode terminal ring 57 which rests on the upper surface of the cap 43 with the terminal posts 56 depending therefrom through the apertures 55 into the upper portion of the body 42. A pair of perforated metal cylinders 58 and 59, one surrounding the other and both coaxially surrounding the baffle member 50 and the cathode cylinders 48 and 49, are mounted on the terminal posts 56 in electrical conducting relation thereto. The cathode and anode cylinders 48, 49, 58 and 59 may be made of rolled stainless steel perforated sheet, for example, and the body 42, cap 43 and baffle member 50 may be made of an appropriate glass or plastic which will not corrode when exposed to water including sufficient electrolytes to enable electrolysis of the water to take place.

It will be understood that when an appropriate potential difference is established between the cathode and anode cylinders immersed in water within the electrolytic tank 42, such water will tend to be dissociated with hydrogen gas collecting at the cathode cylinders 48 and 49 and oxygen gas collecting at the anode cylinders 58 and 59. We have found that the use of perforated anode and cathode cylinders tends to enhance the production of gases by causing bubbles of such gases to free themselves more rapidly from the cylinders and percolate to the surface of the water for collection. It will be understood that the hydrogen gas is trapped within the baffle 50 and conducted out through the coupling tube 44 and into the tube 33. However, referring to FIG. 5, it will be seen that certain of the apertures 55 have been left open by not providing the anode terminal ring 57 with a terminal post 56 corresponding to all of the apertures 55. Thus the oxygen produced at the anode cylinders 58 and 59 and percolating to the surface of the water is free to escape into the atmosphere through the apertures 55 which are not closed by terminal posts 56.

We have found that the use of distilled water including in solution 20% by weight of potassium hydroxide as the electrolyte in the electrolytic tank 32 will enable the dissociation of sufficient hydrogen for use in apparatus according to the teaching of this invention at less than about 10 volts with reasonable power requirements. Thus, the electrical requirements of the electrolytic tank 32 can be easily supplied by means of a full wave rectifier operating on conventional household current, as will be more fully described hereinafter.

It will be understood that as the oxygen is removed from the air within the refrigerator 11, there will be a tendency for the pressure of the remaining gases within the refrigerator 11 to fall below atmospheric pressure. This result is undesirable for two reasons. First, it will tend to result in the influx of oxygen bearing air into the refrigerator 11 and secondly, to the extent that the refrigerator 11 is capable of sustaining a reduced pressure, it will make it difficult to open the door 13 of the refrigerator.

For the above reasons, it is necessary to maintain the pressure of the gases within the refrigerator 11 at atmospheric pressure and to this end we have found it to be desirable to include a relief valve 61 as shown in FIGS. 6, 7 and 8 in the system. Referring to FIG. 6, such relief valve comprises a tube 62 sealed through a wall of the system and having a flange 63 at one end thereof. A rubber diaphragm 64 is mounted across the tube 62 as by means of bolts 65 and collar 66. The diaphragm 64 has a pinhole 68 formed therethrough at its center. Thus as as best shown in FIG. 7, when a positive pressure appears at one side of the diaphragm 64 with respect to the other side thereof, the rubber diaphragm will be distended causing the pinhole 68 to become enlarged and allowing the passage of air therethrough to equalize the pressures on opposite sides of the diaphragm 64.

Referring to FIG. 1, it has been found that the optimum location for the relief valve 61 is on the housing of the centrifugal blower 22. The precise location of the relief valve 61 is preferably selected so that the operation of the blower 22 will have minimum effect on the relief valve 61. Thus, it will be understood that is a pressure below atmospheric should develop in the system during operation, the diaphragm 64 would tend to be distended in such a way as to allow the passage of sufficient air through the pinhole 68 to restore atmospheric pressure. Such air will enter the system immediately prior to the catalytic bed 26 thus tending to insure the immediate removal of oxygen therefrom before it enters the refrigerator 11. In any event, when the refrigerator door 13 is opened the relief valve 61 would be actuated should the pressure within the refrigerator 11 be lower than atmospheric thus enabling the door 13 to be opened without undue effort and avoiding the requirement for undue structural rigidity of the refrigerator walls.

Referring again to FIG. 1, the electrical elements in addition to the centrifugal blower 22, electrolytic tank 33 and catalytic bed temperature sensor 40, according to one embodiment with respect to the refrigerator 11. Such electrical elements include a momentary contact, single pole, single throw start switch 70 mounted with respect to the door 13 such that the contacts thereof will be momentarily closed each time the door 13 is closed. The start switch 70 is electrically connected to the timer control circuit 72 as is the centrifugal blower 22 and one lead of the catalytic bed temperature control switch 40. The timer control circuit 72 is electrically connected to the oxygen content control circuit 74 as is the other lead of the catalytic bed temperature switch 40 and an indicator light 76. The oxygen content control circuit is electrically connected to the primary windings of a double primary, single secondary transformer 78. The secondary winding of the transformer 78 is connected to a full wave bridge rectifier 79 the output of which is connected across the electrodes of the electrolytic tank 32. A power cord 80 electrically connected to the timer control circuit provides the power for the apparatus according to the teaching of this invention.

Referring to FIG. 9, a wiring diagram of the apparatus according to the embodiment of FIG. 1 is shown in which like reference numerals are used to designate the elements and circuits shown in FIG. 1. Thus the terminals of the power cord 80 are shown connected to the timer control circuit contained within dotted lines 72 of FIG. 9. As shown in FIG. 9, the timer control circuit includes a normally closed single pole, single throw motor driven timer switch 82, a double pole, double throw, solenoid actuated switch 84 and a terminal board 88 having ten terminals. As shown in FIG. 9, only the normally open contacts of the double pole double throw solenoid actuated switch 84 are used and the poles of the switch 84 are wired in parallel with each other.

One of the input terminals of the power cord 80 is connected both to the first terminal of the terminal board 88 and to the switching element of the normally closed switch 81 of the motor driven timer switch 82. The other terminal of the power cord 80 is connected through the solenoid 85 of the double pole, double throw, solenoid operated relay 84 to one side of the timer motor 82 of the motor driven timer switch 82.

The normally open momentary contact start switch 70 is connected between terminals 1 and 2 of the terminal board 88. Terminal 2 of the terminal board 88 is connected to terminal 3 thereof which in turn is connected to the contact elements of both poles of the double pole, double throw, solenoid operated relay 84 as well as to the opposite side of the solenoid 85. Thus, the momentary closing of the start switch 70 will activate the solenoid 85 moving the actuator elements of the double pole, double throw switches to their alternate positions. It will be seen that the actuator elements of the double pole, double throw switches are connected to the contact element of the normally closed switch 81 of the motor driven timer switch 82. Thus, upon movement of the actuator elements of the double pole, double throw switches to their alternate positions the solenoid 85 will be connected across the input terminals of the power cord 80 through the double pole, double throw switches and the normally closed switch 81 thus maintaining the double pole, double throw switches in their alternate positions. The motor 83 of the motor driven timer switch 82 is connected in parallel with the solenoid 85 through terminal 4 of the terminal board 88 and thus will begin to turn and will continue to turn until it momentarily opens the contacts of the switch 81 at the end of the time period for which it is designed. The momentary opening of the contacts of the switch 81 will deactivate the solenoid 85 allowing the contacts of the double pole double throw switches to open thus deactivating the timer control circuit and inactivating the apparatus but for the operation of other elements thereof to be described hereinafter.

It will be seen from FIG. 9 that the oxygen content control circuit enclosed in dotted lines 74 comprises a pair of double pole, double throw, solenoid operated switches 92 and 94 together with a terminal board 98 having four terminals thereon. The solenoid 93 of the switch 92 is connected in parallel with the solenoid 85 of the switch 84 through the noramlly open catalytic bed temperature switch 40. Thus, when the catalytic bed 26 has reached a predetermined temperature due to the reaction of oxygen and hydrogen therein, the switch 40 will close and if the switch 81 of the motor controlled timer switch 82 has not yet opened, the switch 92 will be operated. It will be seen that the indicator light 76 is connected across the solenoid 93 of the switch 92 through the actuator and alternate contact of one pole 90 of the double pole, double throw switch 92. Thus, the indicator light 76 will be activated whenever the catalytic bed temperature switch 40 is closed providing a visual indication that the reaction between oxygen and hydrogen in the catalytic bed 26 is above a predetermined level.

The actuator element and alternate contact of the other pole 91 of the double pole throw solenoid actuated switch 92 is connected in parallel with the switch 81 of the motor driven timer switch 82 through terminals 9 and 10 of the terminal board 88 of the timer control circuit 72. Thus the apparatus will remain in operation even though the switch 81 is open at the end of the predetermined time interval.

It will be seen that terminals 1 and 4 of the terminal board 98 of the oxygen content control circuit 74 are connected to terminals 3 and 4 of the terminal board 88 of the timer control circuit 72. It will also be seen that one primary winding of the double primary windings of the transformer 78 are permanently connected to terminals 1 and 4 of the terminal board 98 of the oxygen content control circuit 74. Since the secondary winding of the transformer 78 is connected to the full wave bridge rectifier 79 which is in turn connected to the electrolytic tank 32, it will be seen that power will be supplied to the electrolytic tank 32 at all times while the apparatus of this invention is in operation.

However, as shown in FIG. 9, the second primary winding of the double primary windings of the transformer 78 are connected to terminals 2 and 3 of the terminal board 98 which in turn are connected to terminals 1 and 4 through the respective poles 96 and 97 of the switch 94 when the contacts are in their normal position. Since the solenoid 95 of the switch 94 is connected in parallel with the solenoid 93 of the switch 92 and thus in series with the catalytic bed temperature switch 40, the switch elements 96 and 97 of the switch 94 will be thrown to their alternate position whenever the temperature switch 40 is closed. In their alternate position the switch elements 96 and 97 disconnect the second primary winding of the double primary windings of the transformer 78 from the terminals 1 and 4 of the terminal board 98 and therefore inactivate such second primary winding. It will be understood that the inactivation of such second primary winding will reduce the turns ratio in the transformer 78 thereby reducing the power applied to the electrolytic tank 32 through the power supply 79. Thus the generation of hydrogen in the electrolytic tank 32 will be reduced by about half as soon as the catalytic bed 26 has reached the predetermined termperature for which the temperature switch 40 is set. By this means, the possibility that an excess of hydrogen will be generated during operation of the apparatus is reduced and in fact the actual operation of the apparatus disclosed in FIGS. 1 and 9 has shown that the oxygen will be removed from the air within the refrigerator 11 without a detectable increase in the hydrogen content of such air.

It will be understood, when the level of the reaction between oxygen and hydrogen in the catalytic bed 26 falls below that necessary to maintain the temperature at which the switch 40 is set to close, such switch 40 will open and the apparatus will be inactivated. Whenever the door 13 of the refrigerator 11 is opened and subsequently reclosed, the cycle of operation of the apparatus will be restarted by the momentary closure of the start switch 70 by the closure of the door 13.

Referring to FIGS. 10A and 10B a schematic diagram of a different embodiment of the apparatus of this invention is shown. The embodiment shown in FIGS. 10A and 10B differs from the embodiment shown in FIG. 9 in that the embodiment of FIGS. 10A and 10B includes means for varying the generation of hydrogen gas in more direct proportion to the oxygen content of the air in the refrigerator 11. Thus, as shown in FIG. 10B, a transformer 101 having a single primary winding and a single secondary winding is substituted for the transformer 78 of FIG. 9 which has a double primary winding and a single secondary winding. The generation of hydrogen gas is instead controlled by a means 102 connected in series with the electrolytic tank across the power supply. Since all of the other electrical elements of the embodiment shown in FIGS. 10A and 10B are substantially identical to the electrical elements of the embodiment shown in FIG. 9, like reference numerals have been used to designate like elements in FIGS. 9, 10A and 10B. It will be seen by comparison that the apparatus shown in FIG. 10A is identical to the timer control circuit 72 and start switch 70 as shown in FIG. 9 and operates in the same way as described hereinabove with respect to FIG. 9.

Referring to FIG. 10B, it will be seen that the double pole, double throw, solenoid actuated switch 94 has been omitted. It will also be seen that the indicator light 76 has been omitted and that the switch element 91 of the double pole double throw solenoid actuated switch 92 is not included in the circuit, the switch element 90 thereof being connected in parallel with the switch 81 of the motor driven timer switch 82. The centrifugal blower motor 22 and the catalytic bed temperature switch 40 are connected in the circuit in the same way as in the apparatus of FIG. 9. However, a fuse element 103 has been connected in series with the solenoid 93 of the switch 92. Such fuse element may be of the type designed to open after a predetermined period of continuous operation, for example, in order to inactivate the apparatus if the temperature switch 40 remains closed for an excessive period of time.

As shown in FIG. 10B, the full wave bridge rectifier circuit may consist of four solid state diodes 104 in appropriate array. The means 102 connected in series with the electrolytic tank 32 across the output of the rectifier may take a variety of forms and is conveniently connected in the circuit in parallel with the centrifugal blower motor 22 as shown.

For example, the means 102 may comprise a thermistor control device with the thermistor element thereof mounted in heat conducting relation with respect to the catalytic bed 26 as described in connection with the temperature switch 40. Such thermistor control device would of course be adapted to vary the power applied to the electrolytic tank 32 in direct relation to the temperature of the catalytic bed 26. Thus the generation of hydrogen could be caused to decrease from maximum as the temperature of the catalytic bed decreases from a predetermined temperature above that necessary to maintain the temperature switch 40 in its closed position. This would tend to insure that the amount of hydrogen generated in the catalytic tank will not be in excess of that needed to react with the oxygen present in the air flow through the catalytic bed.

It will be understood that although this invention has been described as applied to a conventional refrigerator, it could also be applied to unrefrigerated containers or to only part of the volume of a refrigerator.

The amount of water condensed from the air flow after it has passed through the catalytic bed 26 will vary depending on the moisture content of the air flow initially as well as upon the time rate of reaction between hydrogen and oxygen in the catalytic bed 26. It is anticipated that little if any make-up water will be required in the catalytic tank 32 yet the provision for the supply of such make-up water utilizing an appropriate inlet and float controlled valve would be an obvious expedient. Similarly, as shown in FIG. 1, an overflow outlet from the electrolytic tank 32 may be provided to drain any excess water to an evaporation pan of the type normally utilized in frost-free refrigerators or the return line may be diverted.

The combination of the apparatus of this invention with a refrigerator provides many non-obvious features of advantage. For example, the operation of the apparatus of this invention will tend to provide the function of maintaining the refrigerator in a frost-free condition. Also, as mentioned above, the fact that the nitrogen rich atmosphere within a refrigerator will be chilled will tend to reduce the diffusion of oxygen bearing gases into the nitrogen rich atmosphere. The compatability of the apparatus according to the teaching of this invention with conventional refrigerator structures is apparent from FIG. 1 of the drawing.

It is anticipated that those skilled in the art will make many additions to and modifications of the embodiments of this invention as disclosed in the drawing and described hereinabove without departing from the scope of the teaching of this invention. Thus, although some of such modifications and additions have been mentioned hereinabove, it is not to be implied that other modifications and additions could not be made.

However, there are certain basic principles according to the teaching of this invention which must be observed. For example, the time rate of generation of hydrogen gas must not exceed 40% of the time rate of air flow through the substantially closed conduit during the initial predetermined length of time of operation of the apparatus according to the teaching of this invention and must decrease thereafter. This is true, since air normally comprises 20% by volume of oxygen gas and since a given volume of oxygen gas requires twice the volume of hydrogen gas to combine therewith into water ($H_2O$).

In fact, tests conducted thus far indicate that apparatus according to the teaching of this invention will provide useful results where the initial maximum time rate of generation of hydrogen gas is less than 1% of the time rate of air flow through the substantially closed conduit. The optimum time rate for the generation of hydrogen gas is believed to be a function of the relationship between the time rate of air flow through the substantially closed conduit to the total substantially closed volume in which the nitrogen rich atmosphere is to be produced. It has been found that if the time rate of air flow is high in comparision to such total volume, then the time rate of generation of hydrogen gas should be a proportionately smaller percentage of such time rate of air flow in order to avoid any increase in the hydrogen content of the atmosphere in such volume.

In an actual test of apparatus according to the embodiment of this invention as shown in FIGS. 1–9, an atmosphere of nitrogen with only trace amounts of other gases, including hydrogen was established in a volume of about 24 cubic inches (including the substantially closed conduit) in about 15 minutes using an estimated time rate of air flow of about 3 cubic feet per minute and an estimated time rate of hydrogen generation of about 1 cubic inch per minute. In this test, the electrolytic tank was operated at 9 volts and 40 amperes for about 5 minutes, after which the voltage and current were reduced to 4 volts and 17 amperes respectively, until the catalytic bed temperature switch deactivated the apparatus at the end of a further time period of about 10 minutes.

It will be understood that the above test does not constitute an optimized example of the method and apparatus of this invention. However, such test does show that the desired result can be obtained using the teaching of this invention in practical time periods and at practical power levels.

The optimization of the method and apparatus of this invention through the use of fuel cell or thermo-electric devices to both recover electric power from the exothermic reaction and to control such reaction is contemplated. A fuel cell is, of course, a type of catalytic means in the broad sense of this invention.

Although not shown in the drawing, it is desirable to thermally insulate the catalytic means from the ambient atmosphere in order to prevent variations in ambient temperatures, for example, from affecting the operation of the apparatus.

What is claimed is:

1. The method of preserving foodstuffs comprising the steps of:
   a. placing said foodstuffs in a container of air at atmospheric pressure that may be selectively sealed substantially air-tight;
   b. sealing said container substantially air-tight with said foodstuffs therein and establishing air flow of given time rate through said container by means of a substantially closed circuit system external to said container and including a gas pump, said conduit having its inlet and outlet coupled to said container at spaced locations;
   c. generating hydrogen gas at a given time rate less than 40% of said given time rate of air flow for a given predetermined length of time and introducing said hydrogen gas into said substantially closed conduit system at a point in said conduit system intermediate said gas pump and said outlet of said conduit;
   d. reacting said hydrogen gas with the oxygen in said air flow in a catalytic means interposed in said substantially closed conduit intermediate said point of introduction of said hydrogen gas and said outlet of said substantially closed conduit;
   e. admitting air into said substantially closed conduit system intermediate said gas pump and said catalytic means during operation in an amount just sufficient to maintain substantially atmospheric pressure in said container and said conduit system;
   f. thermally or electrically sensing the level of reaction of said hydrogen gas with said oxygen in said catalytic means;
   g. after the end of said predetermined length of time, decreasing said given time rate of generation of said hydrogen gas in a direct relation to said level of reaction of said hydrogen gas with said oxygen in said catalytic means; and
   h. restarting said predetermined length of time each time said container is opened and subsequently substantially resealed after a prior said predetermined length of time.

2. The method of claim 1 wherein said step of sensing the level of reaction of said hydrogen gas with said oxygen in said catalytic means includes the step of sensing the temperature of said catalytic means.

3. The method of claim 2 wherein the step of decreasing said given time rate of generation of said hydrogen gas in direct relation to the level of reaction of said hydrogen gas with said oxygen in said catalytic means includes the step of terminating said generation of hydrogen gas when the temperature of said catalytic means falls below a given temperature.

4. The method of claim 1 wherein said step of generating hydrogen gas is carried out through the electrolysis of water into hydrogen and oxygen, collecting said hydrogen and wasing said oxygen to the atmosphere.

5. The method of claim 4 including the steps of condensing the water vapor from said air flow by cooling means surrounding said substantially closed conduit intermediate said catalytic means and said outlet of said conduit, collecting said condensed water vapor and conducting said condensed and collected water vapor into said electrolytic means.

6. The method of claim 4 wherein said step of decreasing said given time rate of generation of said hydrogen gas in a direct relation to the level of reaction of said hydrogen gas with said oxygen in said catalytic means comprises varying the power applied to said electrolytic means in direct proportion to said level of reaction.

7. The method of claim 6 wherein said power applied to said electrolytic means is varied in a direct proportion to the temperature of said catalytic means.

8. Apparatus for preserving foodstuffs comprising:
   a. means defining a container for a given volume of air at atmospheric pressure including means for selectively sealing said container substantially air-tight;
   b. means establishing air flow of given time rate through said container including a gas pump interposed in a substantially closed conduit having its inlet and outlet communicating with said container at spaced locations;
   c. means for generating hydrogen gas at a given time rate less than 40% of said given time rate of air flow during a given predetermined length of time and for introducing said hydrogen gas into said substantially closed conduit system at a point in the conduit intermediate said gas pump and said outlet of said substantially closed conduit;
   d. catalytic means for reacting said hydrogen gas with the oxygen in said air flow interposed in said conduit intermediate said point of introduction of said hydrogen gas into said conduit and said outlet of said conduit;
   e. pressure sensitive valve means extending through the wall of said substantially closed conduit intermediate said gas pump and said catalytic means and adapted to admit air into said conduit when the gas pressure within said conduit is below atmospheric pressure;
   f. means for thermally or electrically sensing the level of reaction between said hydrogen gas and said oxygen in said catalytic means and for decreasing the time rate of generation of hydrogen gas in a direct relation to said level of reaction between said hydrogen gas and said oxygen in said catalytic means;
   g. means for operating said means for generating hydrogen gas independently of said means for sensing the level of reaction between said hydrogen gas and said oxygen in said catalytic means for a given predetermined length of time including switch means for restarting said given predetermined length of time upon opening and subsequent closure of said means for selectively sealing said container substantially air-tight after the end of a prior said given predetermined length of time.

9. Apparatus as claimed in claim 8 wherein said means for generating hydrogen gas comprises an electrolytic tank adapted to dissociate water into hydrogen gas and oxygen gas, collect the hydrogen gas and waste the oxygen gas to the atmosphere.

10. Apparatus as claimed in claim 9 including means for condensing water vapor interposed in said substantially closed conduit between said catalytic means and said outlet of said conduit and means for conducting said condensed water vapor into said electrolytic tank.

11. Apparatus as claimed in claim 8 wherein said catalytic means includes a plurality of platinum coated ceramic pellets packed into a section of said substantially closed conduit, said pellets having interstices therebetween for the passage of gases therethrough.

12. Apparatus as claimed in claim 9 wherein said means for sensing the level of reaction between said hydrogen gas and said oxygen in said catalytic means and for decreasing the time rate of generation of hydrogen gas in a direct relation thereto comprises a temperature sensitive means mounted in heat exchanging relation with said catalytic means and electrically connected to vary the amount of electrical power applied to said electrolytic tank.

13. Apparatus as claimed in claim 12 wherein said temperature sensitive means comprises a temperature sensitive switch electrically connected to interrupt the application of electrical power to said electrolytic tank when the temperature of said catalytic means is below a given temperature.

14. Apparatus as claimed in claim 12 wherein said temperature sensitive means comprises a thermistor control circuit.

15. Apparatus as claimed in claim 10 including means for maintaining a substantially constant water level in said electrolytic tank.

* * * * *

UNITED STATES PATENT AND TRADEMARK OFFICE
CERTIFICATE OF CORRECTION

PATENT NO. : 3,937,847

DATED : February 10, 1976

INVENTOR(S) : WILLIAM ELKINS, HAROLD H. KUEHN and RICHARD H. CHAMBERLIN

It is certified that error appears in the above-identified patent and that said Letters Patent are hereby corrected as shown below:

Column 5, line 21, "outlet 29" should read --outlet 28--.
Column 8, line 23, "is" should read --if--.
Column 8, line 41, --of this invention, are shown in one possible configuration-- should be inserted after "embodiment".
Column 13, line 13, "electric" should read --electrical--.
Column 13, line 32, "closed circuit system" should read --closed conduit system--.
Column 14, line 11, "wasing" should read --wasting--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*